T. B. Young,
Lock Nut.
No. 102,644.　　　　　Patented May 3, 1870.
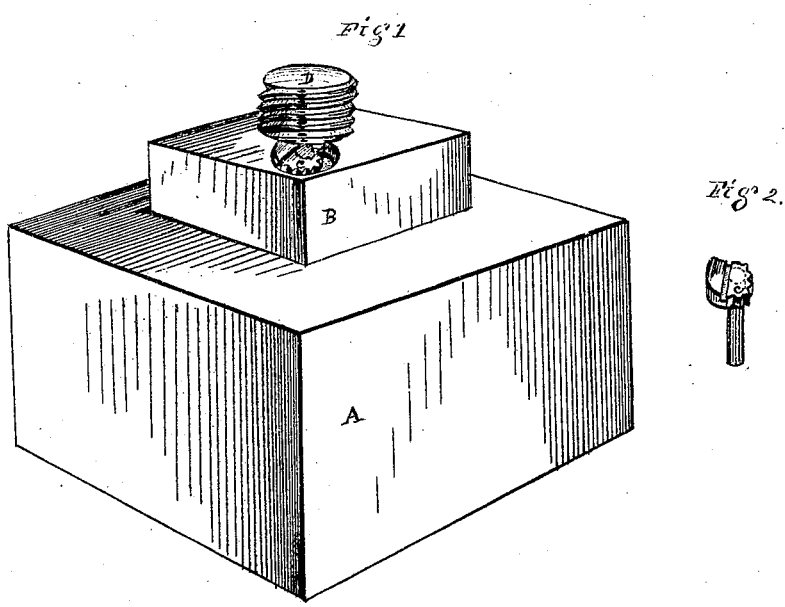
Witnesses:
E. F. Huyck
George Kerr, Jr.
Inventor:
Theodore B. Young

United States Patent Office.

THEODORE B. YOUNG, OF LOUISVILLE, KENTUCKY.

Letters Patent No. 102,644, dated May 3, 1870.

IMPROVEMENT IN SUBSTITUTE FOR JAM-NUTS.

The Schedule referred to in these Letters Patent and making part of the same

I, THEODORE B. YOUNG, of the city of Louisville, county of Jefferson and State of Kentucky, have invented a certain new and useful device as a Substitute for a Jam-Nut on Screw-bolt, of which the following is a specification.

The nature of my invention consists in a small steel pin inserted in the corner of the nut, so as to turn easily, the head of which is made eccentric, or in the form of a scroll, with teeth cut in the edge, and placed so near the bolt that, by turning it slightly, the teeth catches the thread, and any attempt to turn or unscrew the nut only causes the teeth to sink deeper into the thread, and thereby prevents it from turning.

To enable others to make and use my invention, I will proceed to describe it more fully by reference to the drawings, in which—

Figure 1 is a perspective view of the bolt and nut.

Figure 2 is a view of the steel pin, showing the shape of the head.

A is the block through which the bolt passes.

B is the nut of the bolt.

D is the screw of the same.

C is a steel pin secured in the corner of the nut, near the thread of the bolt, but so as to turn easily, the head of which pin is made eccentric, with teeth cut in the edge and countersunk in the top of the nut, so as to be out of the way.

Having thus fully described the construction of my invention, its operation is simply that of screwing up the nut B to its proper place, after which turn the pin C until the teeth catch the thread of the bolt D, and any attempt to turn or unscrew the nut only forces the teeth deeper into the thread, and makes it more secure, by means of the eccentric-shaped head of the pin C; therefore,

What I claim as my invention, and desire to secure by Letters Patent, is—

The revolving steel pin C, in combination with the nut B and bolt D, when arranged, constructed, and operated in the manner and for the purpose set forth.

THEODORE B. YOUNG.

Witnesses:
E. F. HUYCK,
GEORGE KERR, Jr.